UNITED STATES PATENT OFFICE.

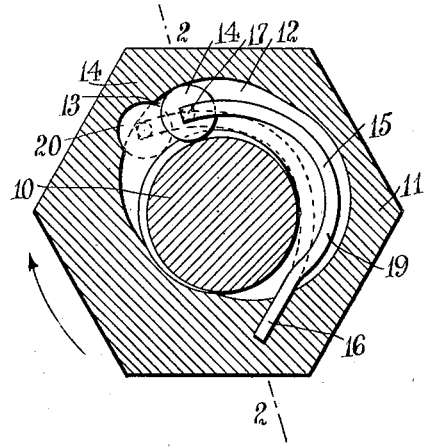
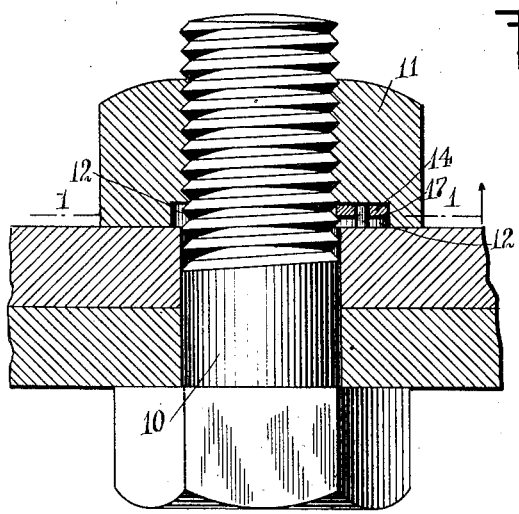
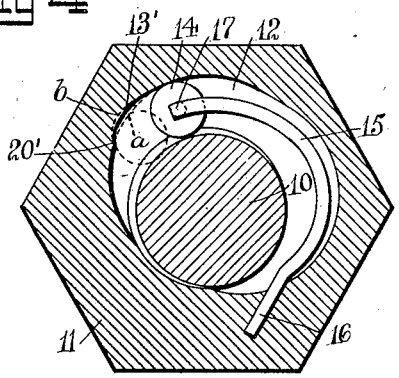
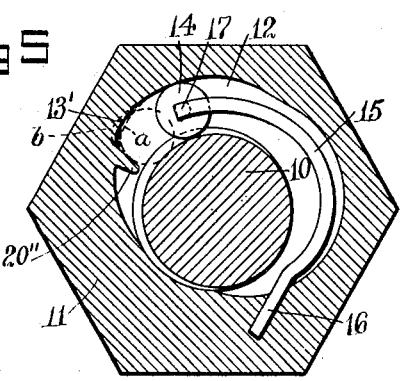
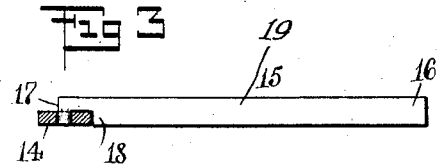

ARNOLD HEINRICH WEGENER, OF HOBOKEN, NEW JERSEY.

NUT-LOCK.

1,093,666.  Specification of Letters Patent.  Patented Apr. 21, 1914.

Application filed June 16, 1913.  Serial No. 773,944.  REISSUED

*To all whom it may concern:*

Be it known that I, ARNOLD HEINRICH WEGENER, a citizen of the United States, and a resident of Hoboken, in the county of Hudson and State of New Jersey, have invented a new and Improved Nut-Lock, of which the following is a full, clear, and exact description.

This invention relates to nut locks of an automatic nature.

Among the objects of the invention is to provide an automatically gripping device for locking a nut to a bolt but which will permit the unscrewing of the nut under force applied thereto by means of a wrench or the like without seriously damaging either the nut or the bolt thread.

The foregoing and other objects of the invention will hereinafter be more fully described and claimed and illustrated in the drawings forming a part of this specification in which like characters of reference indicate corresponding parts in all the views, and in which—

Figure 1 is a transverse section of a bolt and its nut on the line 1—1 of Fig. 2, and showing the locking device in normal position; Fig. 2 is a vertical section substantially on the line 2—2 of Fig. 1; Fig. 3 is a sectional view of the gripping roller and the spring holder for the same; Fig. 4 is a view corresponding to Fig. 1 but indicating a slight modification; and Fig. 5 is a similar view indicating a further modification.

In carrying out this invention in a practical embodiment, I provide a bolt 10 having the usual form of thread and a nut 11 therefor having on either of its faces, herein shown as its inner face, a cavity 12. This cavity 12 is or may be substantially crescent-shaped and may be formed by a rotary milling cutter of any suitable form, the radius of which is larger than the radius of the bolt. The cavity which I prefer to make, however, in this connection, is preferably oblong or formed by the merging of two crescent-shaped cuts.

By virtue of the formation of the cavity 12 as just described there is provided adjacent one end thereof a tapering space 13 in which a roller 14 is normally fitted and so held by a spring 15. One end 16 of the spring is secured in the wall of the cavity 12, preferably at the end thereof opposite the roller. The other end of the spring is provided with a stud 17 upon which is journaled said roller 14, and adjacent the roller is a shoulder 18 adapted to bear against the periphery of the roller. The spring, therefore, has two points or places of contact or engagement with the roller which increases the desired friction and also the strength and reliability of the spring. The intermediate portion 19 of the spring is bow-shaped and extends practically throughout the length of the cavity 12 and normally spaced from both the outer wall of said cavity and the bolt. The normal tendency of said spring is to hold the roller in contact with both the bolt and the wall of the cavity 12 so that when the nut tends to turn in the direction of the arrow in Fig. 1, the tendency will be resisted by the roller riding into the narrower portion of the space 13. Movement of the nut in the other direction, however, is not resisted because the roller turns freely so as to be received in the wider portion of the space or cavity 12.

In devices of this character in which the locking means is substantially hidden from view when the device is applied as shown in Figs. 1 and 2, it sometimes occurs that an operator or workman, not being aware of the fact that the nut is locked, will attempt to unscrew it, causing damage to the thread or breakage of some part. In order to prevent this objection and also to make it comparatively easy for the nut to be removed, yet without interfering with the desired effect of the automatically locking of the nut, I provide a pocket 20 in the tapered end 13 of the socket and into which the roller may drop so as to be out of gripping engagement with the thread of the bolt when the nut is turned under force for unscrewing it. The roller ordinarily is made hard enough so that the nut may be unscrewed as just stated, the roller biting or digging deeply enough into the threaded part of the bolt to permit this action but without doing serious damage to the thread or any other part of the device.

In Fig. 4 is shown a modification in which instead of using a pocket as a means for controlling the gripping movement or operation of the roller, I provide a space 13′ which has slightly less taper than the corresponding space in Fig. 1, but which is terminated by a shoulder 20′ constituting a positive stop for the roller and enabling me to unscrew the nut under force and yet giving sufficient wedging or binding action under normal conditions to prevent the nut from working loose of its own accord. The dotted line $a$ in this figure represents the curvature of the complete arc corresponding to the curve 13 in the previous figure. The dotted line $b$ in this figure indicates a line concentric with the axis of the bolt and the purpose of this line is to show the degree of taper above referred to and indicated at 13'.

Fig. 5 shows a slight variation in the form of the stop 20'' which is more positive in its action than the stop or shoulder 20' of Fig. 4. The taper 13'', however, is substantially the same as in the preceding figure and the action likewise is substantially the same with respect to the roller and means for controlling it.

Having thus described my invention, I claim as new and desire to secure by Letters Patent:—

1. The combination of a bolt having a thread, a nut threaded thereon, and locking means for the nut comprising a roller operating between the bolt thread and a portion of the nut, said nut being provided with a tapered cavity, and means acting upon the roller to normally force the same into the taper of said cavity, said nut being provided with means whereby when forcibly reversed the roller will cease its automatic gripping action, substantially as set forth.

2. The combination of a bolt having a thread, a nut threaded thereon and movable freely in one direction, said nut having a crescent-shaped cavity formed adjacent the bolt in one face thereof, a roller operating in the tapered end of the crescent-shaped cavity, and means to maintain the roller in such position and in normal contact with both the bolt and the outer wall of said cavity, said nut furthermore being provided with means whereby the gripping action of said roller is decreased when the nut is slightly unscrewed under force.

3. The combination of a bolt having a thread, a nut threaded thereon, said nut being provided with a tapered recess adjacent the bolt, a roller operating in said tapered recess and normally resisting movement of the nut in a certain direction while permitting free movement of the nut in the other direction, said nut being provided with a pocket formed in the wall of said recess adjacent said tapered portion into which the roller may be caused to be received when the nut is turned in said certain direction under force.

In testimony whereof I have signed my name to this specification in the presence of two subscribing witnesses.

ARNOLD HEINRICH WEGENER.

Witnesses:
   GEO. L. BEELER,
   PHILIP D. ROLLHAUS.